United States Patent [19]

Le Sergent

[11] Patent Number: 5,154,745
[45] Date of Patent: Oct. 13, 1992

[54] METHOD OF FABRICATING PREFORMS FOR MAKING OPTICAL FIBERS BY DRAWING

[75] Inventor: Christian Le Sergent, Marcoussis, France

[73] Assignee: Alcatel Alsthom Compagnie Generale D'Electricite, France

[21] Appl. No.: 677,180

[22] Filed: Mar. 29, 1991

[30] Foreign Application Priority Data

Mar. 29, 1990 [FR] France .................... 90 04033

[51] Int. Cl.$^5$ .................................. C03C 25/02
[52] U.S. Cl. .................................. 65/3.12; 156/663;
219/121.41; 65/18.2; 65/DIG. 16; 65/61;
65/3.15; 427/163; 427/167
[58] Field of Search .................. 65/3.12, 18.2, 18.3,
65/DIG. 16, 61, 3.15, 31; 427/163, 167;
156/663; 219/121.41

[56] References Cited

U.S. PATENT DOCUMENTS

| | | | |
|---|---|---|---|
| 4,199,337 | 4/1980 | Asam | 65/31 |
| 4,257,797 | 3/1981 | Andrejco et al. | 65/2 |
| 4,334,903 | 7/1986 | MacChesney et al. | 65/3.12 |
| 4,812,153 | 3/1989 | Andrejoo et al. | 65/3.12 |
| 5,000,771 | 3/1991 | Fleming, Jr. et al. | 156/663 |
| 5,000,773 | 3/1991 | LeNoane et al. | 65/3.12 |

FOREIGN PATENT DOCUMENTS

| | | |
|---|---|---|
| 2438017 | 4/1980 | France . |
| 61-151031 | 7/1986 | Japan . |
| 63-222035 | 9/1988 | Japan . |
| 019831 | 1/1989 | Japan . |

OTHER PUBLICATIONS

Patent Abstracts of Japan, vol. 13, No. 156 (C-858) [3504], Apr. 14, 1989; & JP-A-63 310 740 (Hitachi Cable Ltd), Dec. 19, 1988.

Primary Examiner—W. Gary Jones
Assistant Examiner—John J. Bruckner
Attorney, Agent, or Firm—Sughrue, Mion, Zinn Macpeak & Seas

[57] ABSTRACT

A method of fabricating preforms for making optical fibers by drawing, in which a silica deposit, including a doping agent, is formed in successive layers inside a silica-based tube (1) from a chemical vapor containing a gaseous compound of silicon, oxygen, and a gaseous compound of an element for doping the silica, with the composite tube then being subjected to collapsing so as to cause the empty axial zone (3), the tube hollow, to disappear. The silica of the initial tube is then eliminated, by removal, after which a recharge of silica (5) is made around the remaining cylinder (4) by plasma torch deposition from a gas comprising oxygen and a halogen derivative of silica.

4 Claims, 1 Drawing Sheet

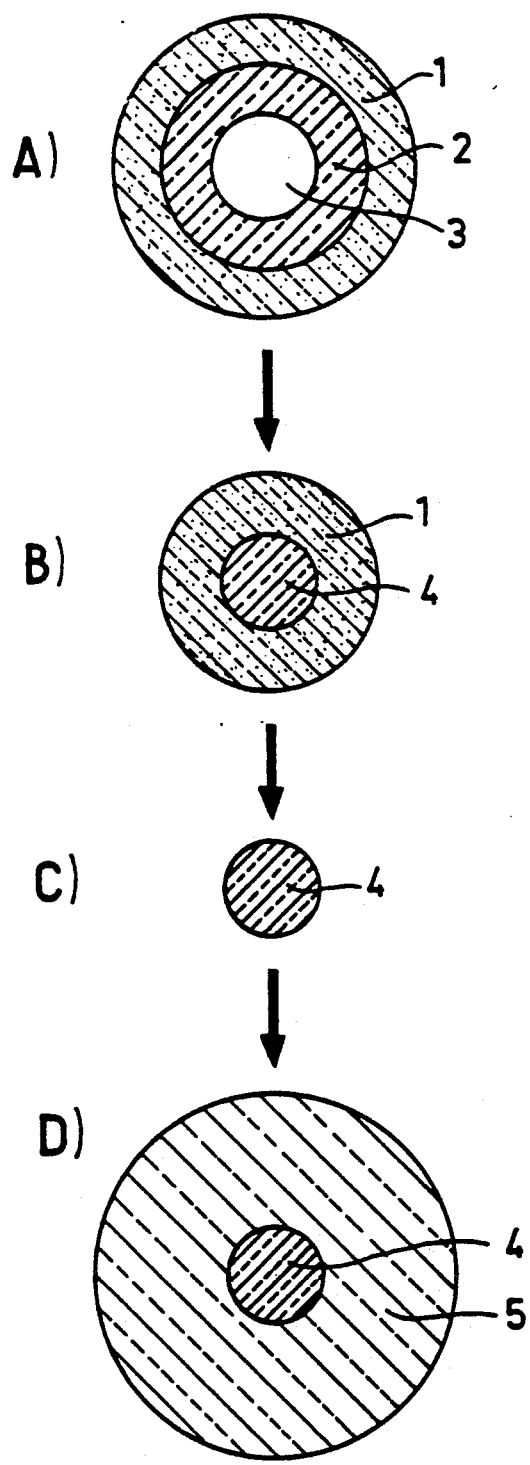

METHOD OF FABRICATING PREFORMS FOR MAKING OPTICAL FIBERS BY DRAWING

The present invention relates to a method of fabricating preforms for making optical fibers by drawing, in which a silica deposit optionally including a doping agent is formed in successive layers inside a silica-based tube from a chemical vapor containing a gaseous compound of silicon, oxygen, and optionally a gaseous compound of an element for doping the silica, with the tube then being subjected to collapsing so as to cause the empty axial zone to disappear.

BACKGROUND OF THE INVENTION

It is well known to deposit successive layers of optionally-doped silica inside a tube of fluorine-containing silica by injecting into the tube a gaseous mixture of silicon halide, oxygen, and a small quantity of a compound of a doping element that increase or decrease the refractive index of the silica, and then heating this mixture, either from the outside of the tube by means of a moving torch, or else by forming a moving plasma.

Nevertheless, this method suffers from certain shortcomings, since in practice the quantity of silica deposited is limited, with the area of the right cross-section of the deposited doped silica hardly being capable of exceeding 150 $mm^2$, and with the ratio of the diameter of the optical cladding obtained after drawing to the diameter of the core remaining greater than 7. This means that no more than 20 km of optical fiber can be drawn from one meter of preform.

An object of the present invention is to provide a method of fabricating such preforms which enables larger quantities of silica to be deposited, with higher ratios of optical cladding diameter to core diameter, and thereby enabling greater lengths of optical fiber to be obtained per unit length of preform, it being possible to reach 100 km to 200 km of optical fiber per meter of preform.

SUMMARY OF THE INVENTION

In the method of the invention, the silica of the initial tube is eliminated after the collapsing operation, and then a recharge is made around the remaining cylinder by plasma torch deposition from a gas comprising oxygen and a halogen derivative of silica.

The method preferably also satisfies at least one of the following features:

the silica of the initial tube is eliminated by evaporation using an oxy-hydrogen torch or a plasma torch, by etching using hydrofluoric acid, or by mechanical machining; and the plasma torch gas for making the recharge includes a fluoride that decomposes easily at high temperature into fluorine to act as a doping agent.

BRIEF DESCRIPTION OF THE DRAWING

The preparation in accordance with the invention of an optical fiber preform is described below by way of example and with reference to the sole diagrammatic figure of the accompanying drawing.

DETAILED DESCRIPTION

In a first operation, referenced A in the figure, the conventional method of vapor deposition from a gaseous mixture of silicon halide, of oxygen, and optionally of a small quantity of a compound of a doping element, accompanied by heating externally by means of a torch or by generating a plasma, is used to form an inner layer 1 inside a tubular silica substrate 2 of ordinary quality. No special precautions need to be taken during heating and some of the silica substrate may possibly be evaporated since it will subsequently be eliminated. An empty axial zone 3 remains.

The second operation, referenced B in the figure, comprises collapsing the tube by heating, thereby eliminating the axial empty space and forming a cylinder 4 corresponding to the deposit made inside the silica tube 2.

In a third operation, represented at C in the figure, the initial silica tube is eliminated either by heating using an oxy-hydrogen torch or a plasma torch, or by chemical etching by means of a hydrofluoric acid, or else by mechanical machining on a lathe. All that is allowed to remain is the cylinder 4 formed by the initially deposited substance.

In the fourth operation (D in the figure), a dry fluorine-containing synthetic silica recharge 5 having an index lower than that of the cylinder silica is formed around the cylinder 4 by means of a plasma torch and using gaseous silicon tetrachloride, oxygen, and a small quantity of sulfur hexafluoride which provides the doping element fluorine.

The resulting preform can be used in a conventional drawing operation to obtain very long lengths of optical fiber, of the order of 100 km to 200 km of optical fiber per meter of preform.

I claim:

1. A method of fabricating preforms for making optical fibers by drawing the preform, comprising:

forming a silica deposit including a doping agent, in successive layers on the inside wall of a silica-based initial tube, from a chemical vapor containing a gaseous compound of silicon, oxygen, and a gaseous compound of an element for doping the silica, heat collapsing the tube to eliminate the tube hollow surrounded by the silica deposit, removing the silica-based initial tube from the silica deposit thereby forming a remaining cylinder, and depositing a recharge of silica around the remaining cylinder by a plasma torch deposition using a gas comprising oxygen and a halogen derivative of silica.

2. A method according to claim 1, wherein the silica-based initial tube is removed by at least one of the following oxy-hydrogen torch evaporation; plasma torch evaporation; hydrofluoric acid etching; and mechanical machining.

3. A method according to claim 2, wherein the plasma torch gas for making the recharge includes a fluoride that decomposes easily at high temperature into fluorine to dope the recharge of silica with fluorine.

4. A method according to claim 1, wherein the plasma torch gas for making the recharge includes a fluoride that decomposes easily at high temperature into fluorine to dope the recharge of silica with fluorine.

* * * * *